United States Patent [19]

Schoenhard

[11] Patent Number: 4,629,780

[45] Date of Patent: Dec. 16, 1986

[54] POLYMER LAYER RECOVERY FROM A MULTILAYERED CHIP MATERIAL

[76] Inventor: James D. Schoenhard, 104 W. Knox St., Morrison, Ill. 61270

[21] Appl. No.: 802,791

[22] Filed: Nov. 27, 1985

Related U.S. Application Data

[63] Continuation-in-part of Ser. No. 776,256, Sep. 16, 1985, abandoned.

[51] Int. Cl.$^4$ .............................................. C08J 11/22
[52] U.S. Cl. ..................................... 528/488; 521/48; 521/48.5; 528/489
[58] Field of Search ................. 528/488, 489; 521/48, 521/48.5

[56] References Cited

U.S. PATENT DOCUMENTS

| | | | |
|---|---|---|---|
| 3,652,466 | 3/1972 | Hittel | 521/48 |
| 4,033,907 | 7/1977 | Wolf | 528/489 |
| 4,324,705 | 4/1982 | Seto | 521/48 |

Primary Examiner—Paul R. Michl
Attorney, Agent, or Firm—Cook, Wetzel & Egan, Ltd.

[57] ABSTRACT

A polymer layer of polyester or polyvinyl chloride is recovered from a multilayered scrap or waste chip material by contacting the chip material with an aqueous solution containing a base metal hydroxide and a reagent selected from the group consisting of a salt, an amine, and an oxidizing agent. The removal process is accelerated by using, either singularly or in combination, an alkyl dimethyl benzyl ammonium chloride, heat, or agitation. Thereafter the polymer layer is isolated and recovered.

31 Claims, No Drawings

POLYMER LAYER RECOVERY FROM A MULTILAYERED CHIP MATERIAL

CROSS REFERENCE TO RELATED APPLICATION

This application is a continuation-in-part of my application Ser. No. 776,256 filed Sept. 16, 1985, now abandoned for "Polymer Layer Recovery From A Multilayered Chip Material."

BACKGROUND OF THE INVENTION

The present invention is directed generally to methods of recycling used or scrap polymers and more particularly to recovering a polyester or a polyvinyl chloride layer from a multilayered scrap or waste material in a form suitable for reprocessing into useful articles.

The supply of natural resources has been dwindling and, at the same time, the use of synthetic materials has increased dramatically. Known supplies of raw materials such as petroleum are being rapidly consumed in the manufacture of polymers. Rapid, efficient, safe and relatively low cost methods of recycling scrap or waste polymer into new and useful articles would reduce the requirement for raw materials and thus preserve natural resources.

One major source of scrap or waste polyester is discarded liquid containers such as those used by the liquid beverage industry. Empty beverage containers are generally discarded, too often along public roadways or in public parks. Tremendous quantities of polyester could be salvaged and recycled from these containers. However, since polyester allows gas molecules to pass, the containers are generally lined with a thin layer of polyvinylidene chloride. The polyester must be separated before it can be reprocessed.

Another important source of scrap or waste polyester is photographic or X-ray film. Such film generally consists of three main layers: a polyester base or sheet for toughness and strength; an intermediate layer of polyvinylidene chloride; and an upper layer of gelatin containing a silver halide. However, scrap or waste film may also contain polyvinyl chloride or be contaminated with cellulose acetate. Silver recovery processes generally remove only the silver bearing gelatin layer.

Substantially all of the known prior art polyester recovering methods involve the use of one or more organic solvents such as tetrahydrofuran. Many of these organic solvents are inherently dangerous, are an explosion or fire hazard, harmful to workers' health, and remain in, and adversely affect the environment.

It is a primary object of this invention to recover polymers such as polyester or polyvinyl chloride from multilayered scrap or waste materials by a rapid, efficient, safe, and relatively low cost process.

SUMMARY OF THE INVENTION

The present invention is directed to a process for recovering a polymer layer such as polyester or polyvinyl chloride from a multilayered scrap or waste material, in a rapid, efficient, safe, and relatively low cost method, and wherein the recovered polymer is in a form suitable for reprocessing.

The polymer is recovered by contacting chips of the multilayered material with an aqueous solution containing a base metal hydroxide and a reagent selected from the group consisting of a salt, an amine, and an oxidizing agent. If salt is chosen, the salt is a base metal chloride, for example sodium, or potassium. If an oxidizing agent is chosen, the oxidizing agent can be sodium hypochlorite, ozone, or hydrogen peroxide. If the amine is chosen, it will consist of using both monoethanolamine and morpholine.

The aqueous solution is allowed to contact a multilayered chip material until the polymer layer and the other layers of the chip material are separated. The recovery process can be accelerated by the addition of, singularly or in combination, an alkyl dimethyl benzyl ammonium chloride, heat or agitation. Thereafter, the polymer layer material is recovered from the aqueous solution for later reuse as a raw material.

DESCRIPTION OF THE PREFERRED EMBODIMENT

Polyester is recovered as a polyester layer from the multilayer chip scrap or waste material. The processed film is in chip form. If the scrap or waste material is not already in chip form, it is run through a chopper and, if necessary, a separator. For example, beverage containers generally consist of multilayered sidewalls wherein polyester comprises one of the layers, a sealed end (not containing polyester), and an open end on which an aluminum closure may be placed. To separate the multilayered sidewall material containing the polyester from the other portions of the container, the entire container is, for instance, placed in a chopper, and the chopped material is thereafter run through a gravity separator.

In accordance with my present invention, a saturated base metal hydroxide solution is used comprising one of the hydroxide of sodium, potassium, magnesium, and calcium. Additionally, the base metal chloride can comprise one of the chloride of sodium, potassium, magnesium, and calcium. However, the recovery process comes to completion most rapidly using complementary base metals, such as sodium hydroxide and sodium chloride.

Scrap or waste polyester may be contaminated with dies, particularly if the scrap or waste polyester was used as photographic or x-ray film. Sodium hypochlorite will bleach the residual dies from the scrap or waste polyester and will result in the recovery of a whiter and therefore, more readily recyclable polyester layer material.

The recovery process can be accelerated by the addition of, singularly or in combination, an alkyl dimethyl benzyl ammonium chloride, heat, or agitation. For example, in one preferred embodiment the process comes to completion with heat alone after about two hours, but with heat and alkyl dimethyl benzyl ammonium chloride the process comes to completion after about one and onehalf hours.

Recovery can be accomplished using any means that will bring the aqueous solution into intimate contact with the chip material. Such means can include, but is not restricted to, open or closed vats, drums or tanks, or an intermittent conveyor system moving through a solvent zone or conduit. Similarly, the chip material can be brought into contact with the aqueous solution or the aqueous solution can be added to the chip material.

In the preferred embodiment, the saturated base metal hydroxide solution, the alkyl dimethyl benzyl ammonium chloride, the sodium hypochlorite, and the base metal chloride are prepared as an aqueous solution. The temperature of the aqueous solution is then raised to between 60° and 65° Centigrade and the multilayered chip material is brought into contact with the heated aqueous solution. The chips are allowed to remain in contact with the aqueous solution for at least one and one-half hours at which time the polyvinylidene chloride will have gone into solution. The polyester layer material can then be recovered by isolating the layer material from the aqueous solution. This process can be repeated on successive batches by reconstituting and reusing the original aqueous solution.

In an alternative embodiment, an aqueous solution is prepared at room temperature. Water, saturated base metal hydroxide solution, the oxidizing agent, and base metal chloride are prepared as an aqueous solution. The temperature of the aqueous solution is then raised to about 80° Centigrade and the multilayered chip material is brought into contact with the heated aqueous solution. After approximately 15 minutes, the chip material will appear to be a dirty brown. After approximately one-half hour, the chip material will appear blackish-brown, and a pealing effect will be observed. After approximately 45 minutes, a distinct color change will take place and the chip material will appear black, brown. At this point slight agitation will reveal a white tint. More vigorous agitation will separate the polyester layer from the polyvinylidene chloride layer, which may appear as a flocculate precipitate. The polyester layer material can then be isolated and recovered.

Polyvinyl chloride is recovered in another alternative embodiment. Saturated base metal hydroxide solution, sodium hypochlorite, alkyl dimethyl benzyl ammonium chloride, and base metal chloride are prepared as an aqueous solution. The temperature of the aqueous solution is then raised to between 60° and 65° Centigrade and the multilayered chip material is brought into contact with the heated aqueous solution. The chips are allowed to remain in contact with the aqueous solution for at least one and one-half hours at which time the layers will have separated and the polyvinyl chloride layer can be isolated and recovered.

Heat accelerates the recovery process but is not essential to the invention. The aqueous solution can be heated before it is contacted with the chip material or the chip material and the aqueous solution can be brought into contact and then heated. Generally, a solvent based reaction will accelerate as the constituents are heated to the boiling point of the liquid. However, the recovery of the present invention will occur at a sufficiently rapid rate and consume a minimum amount of energy when the aqueous solution is heated to 60°-80° Centigrade. The solution, however, need not be heated to recover the polymer layer. At room temperature, recovery can be completed in 12 to 36 hours depending on the layer materials.

Agitation can also accelerate the removal process. In the one embodiment, agitation by means of water jets is applied as a finishing step. Agitation, however, can be applied earlier in the recovery process, even throughout the recovery process. Various means other than water jets can provide agitation, such as, but not limited to, a mechanical vibrator, a sonic resonator, or an air jet.

To complete the recovery process, the separated polymer layer is isolated from the aqueous solution. Separation means include, but is not limited to, gravity separation, filtration, centrifuging or even overflowing the aqueous solution.

The following examples will fully illustrate the above described invention. The chip material used in these examples was, unless otherwise noted, X-ray film from which silver had previously been stripped.

EXAMPLE 1

A solution having the following constituents was prepared at room temperature.
One liter Water
0.2 liter potassium hydroxide (saturated)
0.4 pounds potassium chloride
The resulting aqueous solution was heated to 80° Centigrade and one half liter of loose chip material was thereafter added to the heated aqueous solution. The temperature was maintained at 80° Centigrade for one hour after which the solution was agitated and a polyester layer material removed.

EXAMPLE 2

Using the same general procedure described in Example 1, several chip containing solutions were allowed to remain at room temperature throughout the removal process. The polyester layer material separated much later than in Example 1, where the solution was heated. Durations ran between 12 and 36 hours.

EXAMPLE 3

Using a multilayered bottle chip material, the same general procedures described in Example 1 were followed. However, 0.2 liter of sodium hypochlorite was added to the aqueous solution before the addition of the chip material. The solution was then heated to 80° Centigrade. A polyester layer was recovered in approximately one hour.

EXAMPLE 4

Using the general procedures described in Example 1, the concentration of potassium chloride was lowered from 0.4 pounds to 0.2 pounds. The polyester layered material separated and was recovered after two and one-half hours. Lowering the concentration of potassium chloride by one-half increased the duration of the recovery process from one hour to two and one-half hours.

EXAMPLE 5

A solution having the following constituents was prepared at room temperature.
One liter Water
0.2 liter sodium hydroxide (saturated)
0.1 liter monoethanolamine
0.06 liter morpholine
The resulting aqueous solution was heated to 60° Centigrade and one pound of chip material was thereafter added to the heated aqueous solution. The temperature was maintained at 60° Centigrade for 40 minutes. Thereafter, the material had separated and was recovered. It was noted that this solution removed the polyester layer from polyvinylidene chloride but not from polyvinyl chloride.

EXAMPLE 6

Sufficient aqueous solution having the following constituents was prepared at room temperature
13 gallons water
13 gallons sodium hydroxide (saturated)
Twenty-five pounds of chip material was added to the solution and the solution was then agitated. Thereafter, 2.6 gallons of a 30% by weight hydrogen peroxide solution was added to the above aqueous solution. A vigorous reaction was observed. After 20 minutes, a reddish, brown precipitate was evident and a polyester layer was then recovered.

EXAMPLE 7

Using the same general procedures described in Example 6, except that an ozone generator is integrated such that ozone is bubbled through the caustic chip containing solution whereupon as the reaction proceeds the solution becomes saturated and the excess ozone can be trapped and recycled.

EXAMPLE 8

A solution having the following constituents was prepared at room temperature.
One liter Water
0.2 liter sodium hydroxide (saturated)
0.3 liter sodium hypochlorite
0.4 pounds sodium chloride The resulting aqueous solution was heated to 60° Centigrade and one half liter of loose chip material was thereafter added to the heated aqueous solution. The temperature was maintained at 60° Centigrade for about two hours after which a polyester layer material was recovered.

EXAMPLE 9

Using the same general procedure as described in Example 8, 0.001 liter of an alkyl dimethyl benzyl ammonium chloride having mixed carbon chains of 14 to 16 carbons was added to the aqueous solution before the addition of the chip material. The solution was maintained at 60° Centigrade. A polyester layer was recovered in about one and one-half hours.

EXAMPLE 10

Using a multilayered scrap chip material containing polyvinyl chloride, the same general procedures described in Example 9 are followed. The solution is maintained at about 65° Centigrade. The polyvinyl chloride layer is recovered in about one and one-half hours.

Although variations and modifications of the present proportions and procedures will be noted by those versed in the art, it is to be understood that the invention can be practiced otherwise than as specifically described without departing from the scope or spirit of the appended claims.

I claim as my invention:

1. A process for recovering polyester from a layered chip material having at least one polyester layer, said process comprising the steps of:
    preparing an aqueous solution having, for each liter of water, at least 0.2 pounds of potassium chloride, 0.2 liter of sodium hypochlorite, and 0.2 liter saturated potassium hydroxide;
    heating the aqueous solution containing the layered chip material to approximately 80° Centigrade;
    contacting the layered chip material with the aqueous solution until the polyester layer begins to separate from the layered chip material;
    agitating the aqueous solution containing the layered chip material; and
    recovering the polyester layer from the aqueous solution.

2. The process for recovering polyester from a layered chip material having at least one polyester layer, said process comprising the steps of:
    preparing an aqueous solution having, for each liter of water, at least 0.1 liter monoethanolamine, 0.06 liter morpholine, and 0.2 liter saturated base metal hydroxide solution selected from the group consisting of the hydroxide of one of sodium, potassium, magnesium, and calcium;
    contacting the layered chip material with the aqueous solution until the polyester layer is separated from the layered chip material; and
    recovering the polyester layer from the aqueous solution.

3. The process of claim 2 further including heating the aqueous solution containing the layered chip material to approximately 80° Centigrade.

4. The process of claim 2 further including agitating the aqueous solution containing the layered chip material.

5. A process for recovering polyester from a layered chip material having at least one polyester layer, said process comprising the steps of:
    preparing an aqueous solution having at least one part by volume of water and one part by volume of a saturated base metal hydroxide solution selected from the group consisting of the hydroxide of one of sodium, potassium, magnesium, and calcium;
    contacting the layered chip material with the aqueous solution;
    agitating the aqueous solution containing the layered chip material;
    combining at least 0.2 part by volume of a 30% by weight hydrogen peroxide solution with the aqueous solution containing the layered chip material; and
    recovering the polyester layer from the aqueous solution.

6. A process for recovering polyester from a layered chip material having at least one polyester layer, said process comprising the steps of:
    preparing an aqueous solution having, for one liter of water, at least approximately 0.2 liter of a saturated base metal hydroxide selected from the group consisting of the hydroxide of one of sodium, potassium, magnesium, and calcium;
    contacting the layered chip material with the aqueous solution;
    agitating the contacted material;
    bubbling ozone through the aqueous solution containing the layered chip material to separate the polyester layer from the layered chip material; and
    recovering the polyester layer from the aqueous solution.

7. A process for recovering polyester from a layered chip material having at least one polyester layer, said process comprising the steps of:
    preparing an aqueous solution to which is added, for each liter of water, at least about 0.2 pounds of a base metal chloride, at least about 0.2 liter of a saturated base metal hydroxide selected from the group consisting of a hydroxide of one of sodium, potassium, magnesium, and calcium, and at least about 0.2 liter of sodium hypochlorite;
    heating the aqueous solution containing the layered chip material at least to about 60° Centigrade;
    contacting the layered chip material with the aqueous solution unfil the polyester layer is separated from the layered chip material; and
    recovering the polyester layer from the aqueous solution.

8. The process of claim 7 wherein the layered chip material is contacted with the aqueous solution thereafter heating the chip containing aqueous solution to approximately 60° Centigrade.

9. The process of claim 7 wherein to the aqueous solution is added, for each liter of water, at least about 0.001 liter of alkyl dimethyl benzyl ammonium chloride of the formula

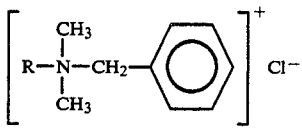

where R is selected from the group consisting of alkyl groups.

10. The process of claim 9 wherein R is selected from the group of alkyl groups having a carbon chain of from fourteen to sixteen carbons.

11. A process of recovering polyester from a layered chip material having at least one polyester layer, said process comprising the steps of:
preparing an aqueous solution to which is added, for each liter of water, at least about 0.4 pounds of sodium chloride, about 0.3 liter of sodium hypochlorite, and about 0.2 liter of saturated sodium hydroxide;
heating the aqueous solution containing the layered chip material to at least about 60° Centigrade;
contacting the layered chip material with the aqueous solution until the polyester layer is separate from the layered chip material; and
recovering the polyester layer from the aqueous solution.

12. The process of claim 11 wherein to the aqueous solution is added, for each liter of water, at least about 0.001 liter of alkyl dimethyl benzyl ammonium chloride of the formula

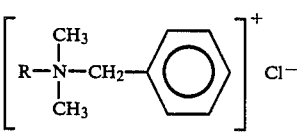

where R is selected from the group consisting of alkyl groups.

13. The process of claim 12 wherein R is selected from the group of alkyl groups having a carbon chain of from fourteen to sixteen carbons.

14. A process for recovering polyvinyl chloride from a layered chip material having at least one polyvinyl chloride layer, said process comprising the steps of:
preparing an aqueous solution to which is added, for each liter of water, at least about 0.4 pounds of sodium chloride, about 0.3 liter of sodium hypochlorite, and about 0.2 liter of saturated sodium hydroxide;
heating the aqueous solution containing the layered chip material to at least about 60° Centigrade;
contacting the layered chip material with the aqueous solution until the polyvinyl chloride layer is separated from the layered chip material; and
recovering the polyvinyl chloride layer from the aqueous solution.

15. The process of claim 14 wherein to the aqueous solution is added, for each liter of water, at least about 0.001 liter of alkyl dimethyl benzyl ammonium chloride of the formula

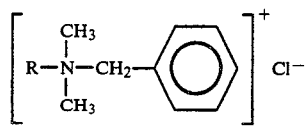

wherein R is selected from the group consisting of alkyl groups.

16. A process for recovering polyester from a layered chip material having at least one polyester layer, said process comprising the steps of:
preparing an aqueous solution to which is added, for each liter of water, at least about 0.2 pounds of a base metal chloride, at least about 0.2 liter of sodium hypochlorite, and at least about 0.2 liter of a saturated base metal hydroxide selected from the group consisting of a hydroxide of one of sodium, potassium, magnesium, and calcium;
contacting the layered chip material with the aqueous solution until the polyester layer is separated from the layered chip material; and
recovering the polyester layer from the aqueous solution.

17. The process of claim 16 wherein the aqueous solution contacts the layered chip material for about 12 hours.

18. The process of claim 16 wherein the aqueous solution contains, for each liter of water, at least 0.4 pounds of base metal chloride.

19. The process of claim 16 further including a step of heating the aqueous solution containing the layered chip material to approximately 80° Centigrade.

20. The process of claim 16 further including a step of agitating the aqueous solution containing the layered chip material.

21. The process of claim 20 wherein said agitation is provided by means of a water jet.

22. The process of claim 20 wherein said agitation is provided by means of a sonic vibrator.

23. The process of claim 16 wherein the chip material has a layer of polyvinylidene chloride.

24. A process for recovering polyester from a layered chip material having at least one polyester layer, said process comprising the steps of:
preparing an aqueous solution to which is added, for each liter of water an oxidizing agent selected from the group consisting of sodium hypochlorite, hydrogen peroxide, and ozone and conbinations thereof, at least about 0.2 pounds of a base metal chloride, and at least about 0.2 liter of a saturated base metal hydroxide selected from the group consisting of a hydroxide of one of sodium, potassium, magnesium, and calcium;
contacting the layered chip material with the aqueous solution until the polyester layer is separated from the layered chip material; and
recovering the polyester layer from the aqueous solution.

25. The process of claim 2 including heating the aqueous solution containing the layered chip material to approximately 60° Centigrade.

26. A process for recovering polyester from a layered chip material having at least one polyester layer, said process comprising the steps of:

preparing an aqueous solution to which is added, for each liter of water, at least 0.4 pounds of a base metal chloride, at least about 0.2 liter of a saturated base metal hydroxide selected from the group consisting of a hydroxide of one of sodium, potassium, magnesium, and calcium, and at least about 0.2 liter of sodium hypochlorite;

contacting the layered chip material with the aqueous solution until the polyester layer is separated from the layered chip material; and recovering the polyester layer from the aqueous solution.

27. The process of claim 26 further including heating the aqueous solution containing the layered chip material to approximately 80° Centigrade.

28. The process of claim 26 further including agitating the aqueous solution containing the layered chip material.

29. The process of claim 28 wherein agitation is provided by means of a water jet.

30. The process of claim 28 wherein agitation is provided by means of a sonic vibrator.

31. The process of claim 28 wherein agitation is provided by means of an air jet.

* * * * *